US006826728B1

(12) United States Patent
Horiyama

(10) Patent No.: US 6,826,728 B1
(45) Date of Patent: Nov. 30, 2004

(54) COLLECTIVELY DESIGNATING AND INSTALLING FONT TYPES AND UNICODE BASED LANGUAGES

(75) Inventor: Jun Horiyama, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/322,004

(22) Filed: May 28, 1999

(30) Foreign Application Priority Data

Jun. 3, 1998 (JP) .......... 10-169147
May 13, 1999 (JP) .......... 11-132695

(51) Int. Cl.[7] .......... G06F 3/14
(52) U.S. Cl. .......... 715/542; 715/536; 345/171
(58) Field of Search .......... 715/535, 536, 715/542; 345/171

(56) References Cited

U.S. PATENT DOCUMENTS 5,495,577 A * 2/1996 Davis et al. .......... 707/542
5,659,769 A * 8/1997 Kida et al. .......... 704/1
5,793,381 A * 8/1998 Edberg et al. .......... 345/467
5,802,538 A * 9/1998 Ooishi .......... 345/467
5,990,907 A * 11/1999 Colletti .......... 345/467
5,999,706 A * 12/1999 Chrosny .......... 358/1.11
6,003,050 A * 12/1999 Silver et al. .......... 707/536
6,065,008 A * 5/2000 Simon et al. .......... 345/467
6,377,966 B1 * 4/2002 Cooper et al. .......... 345/467
6,490,051 B1 * 12/2002 Nguyen et al. .......... 358/1.15

OTHER PUBLICATIONS

Yamada Language Center Font Archive—http://babel.uoregon.edu/yamada/fonts.html, 2/998, from http://www.archive.org.*

Setting Fonts for International Web SItes, http://help.netscape.com/kb/consumer/19971112-43.html , Nov. 12, 97.*

Bames, "10 Minute Guide to Windows 3.1", SAMS, 1992, p. 72–75, 116–119.*

Wordperfect 6.1 font selection screendumps, fig. 1–2, 1996.*

* cited by examiner

*Primary Examiner*—Cesar B Paula
(74) *Attorney, Agent, or Firm*—Fitzpatrick, Cella, Harper & Scinto

(57) ABSTRACT

It is an object that in case of installing a font of a unified character code, desired characters corresponding to a country or a region can be installed. To accomplish the above object, a type of a font which is selected by the user and should be installed is designated, characters of a designated language are specified. A list of types of fonts of the specified characters is displayed. The language which is selected by the user and should be installed is designated. Font data is installed in accordance with designated country information. A processing routine is finished.

16 Claims, 7 Drawing Sheets

| COUNTRY ID | COUNTRY INFORMATION |
|---|---|
| 1 | JAPANESE |
| 2 | TRADITIONAL-CHINESE |
| 3 | SIMPLIFIED-CHINESE |
| 4 | KOREAN |

FIG. 3A

| FONT TYPE | CHR CODE | COUNTRY ID | GLYPH DATA |
|---|---|---|---|
| A-MING | 10001 | 1 | ****··· |
| A-MING | 10002 | 1 | ****··· |
| A-MING | 10003 | 1 | ****··· |
| A-MING | 10004 | 1 | ****··· |
| A-MING | 10005 | 1 | ****··· |
| ⋮ | ⋮ | ⋮ | ⋮ |

FIG. 3B

| FONT TYPE | CHR CODE | COUNTRY ID | GLYPH DATA |
|---|---|---|---|
| A-MING | 20001 | 2 | ****··· |
| A-MING | 20002 | 2 | ****··· |
| A-MING | 20003 | 2 | ****··· |
| A-MING | 20004 | 2 | ****··· |
| A-MING | 20005 | 2 | ****··· |
| ⋮ | ⋮ | ⋮ | ⋮ |

COLLECTIVELY DESIGNATING AND INSTALLING FONT TYPES AND UNICODE BASED LANGUAGES

BACKGROUND OF THE INVENTION

1. Field of the Invention

The invention relates to a character processing apparatus, a character processing method, a memory medium, and a font. More particularly, the invention relates to a character processing apparatus, a character processing method, and a memory medium for installing font data.

2. Related Background Art

In case of forming documents by characters corresponding to a plurality of countries or regions by using a character processing apparatus such as word processor, workstation, or personal computer, it is necessary to express the documents by the characters used in those countries or regions.

In recent years, the unified character code system called a unicode in which specific character codes are allocated to all of the characters in the world has been proposed. In the unified character code system, all of the font data necessary in a cultural sphere or region in the world is mainly individually classified every country. It is, therefore, considered that the user can form documents without particularly being conscious of a country which uses specific font data.

In a partial region in Asia such as Japan or China, the characters are expressed generally by using Chinese characters. In the unified character code system, simplified Chinese characters or traditional Chinese characters which are used as a same meaning in the same country or region are also allocated to different character codes, so that it is considered that a document using desired Chinese characters can be formed while also distinguishing the simplified Chinese characters and traditional Chinese characters.

However, according to the unified character code system, the codes are allocated to the character shapes (hereinafter, referred to as "glyphs") and a country or region which uses the glyphs themselves is not specified nor distinguished. Moreover, similar glyphs are allocated to the same code. Therefore, in case of forming a document using characters of a specific country (for instance, Japanese or Chinese), there is a fear such that similar characters (for example, Korean characters) which are not used in the specific country mixedly exist in the document. There is, consequently, a problem that whether the characters are the characters used in the specific country or not needs to be discriminated while observing a display screen every time.

SUMMARY OF THE INVENTION

The invention is made in consideration of the above problems and it is an object to provide a character processing apparatus which can easily install desired characters corresponding to a country or a region in case of using a font of unified character codes and to provide a processing method of character data and a memory medium.

To accomplish the above object, according to the invention, there is provided a character processing apparatus comprising: first designating means for designating a language or a country of a font to be installed; and installing means for installing font data of the language or country designated by the first designating means from memory means for storing font data corresponding to a plurality of languages or countries.

According to the invention, there is provided a character processing method comprising: a first designating step of designating a language or a country of a font to be installed; and an installing step of installing font data of the language or country designated in the first designating step from memory means for storing font data corresponding to a plurality of languages or countries.

According to the invention, there is provided a memory medium in which a program has been stored, wherein the program comprises: a first designating step of designating a language or a country of a font to be installed; and an installing step of installing font data of the language or country designated in the first designating step from memory means for storing font data corresponding to a plurality of languages or countries.

According to the invention, there are provided a font comprising: character pattern data corresponding to a plurality of languages or countries; and first identification information to identify in which language or country each character is used.

According to the invention, there is provided a memory medium for storing a font comprising: character pattern data corresponding to a plurality of languages or countries; and first identification information to identify in which language or country each character is used.

The above and other objects and features of the present invention will become apparent from the following detailed description and the appended claims with reference to the accompanying drawings.

BRIEF DESCRIPTION OF THE DRAWINGS

FIGS. 3A and 3B are font tables;

DETAILED DESCRIPTION OF THE PREFERRED EMBODIMENTS

Embodiments of the invention will now be described in detail hereinbelow with reference to the drawings.

Figure 1:
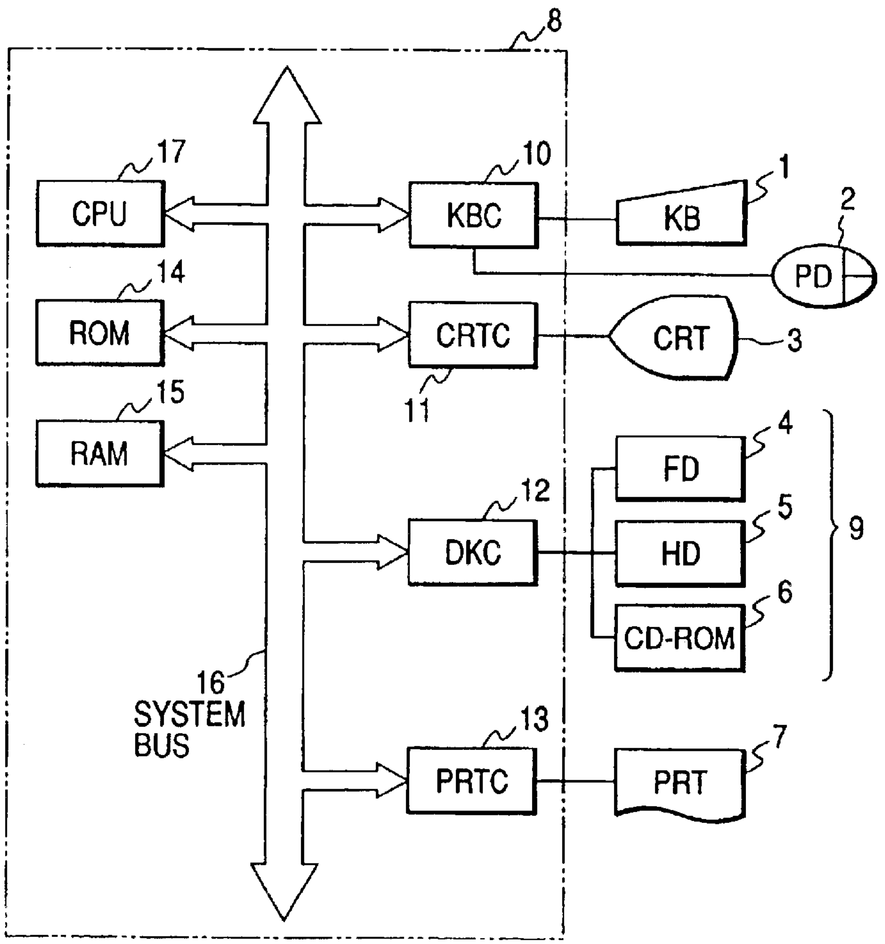
FIG. 1 is a block constructional diagram showing an embodiment of a character processing apparatus according to the invention.

FIG. 1 is a block constructional diagram showing an embodiment of a character processing apparatus according to the invention. The character processing apparatus comprises: a keyboard (KB) 1 to input character codes, control codes, or the like; a pointing device (PD) 2 to perform a predetermined input operation; a CRT display 3 to display input data or the like; a flexible disk (FD) 4 in which font-related data, application programs, and the like, which will be explained hereinlater, have been stored; a hard disk (HD) 5 in which an operating system (OS) has been stored; a CD-ROM 6 in which font-related data and application programs similar to those of the FD 4 have been stored; a printer (PRT) 7 to output document data which was character processed; and an apparatus main unit 8. An external storing device 9 is constructed by the FD 4, HD 5, and CD-ROM 6.

Specifically speaking, the apparatus main unit 8 comprises: a keyboard controller (KBC) 10 to control input information from the KB 1 or PD 2; a CRT controller (CRTC) 11 for reading out a bit map image converted from a character code and transferring the bit map image to the CRT display 3; a disk controller (DKC) 12 to control a data transmission or the like between the DKC and the external storing device 9; a printer controller (PRTC) 13 to control the operation of the printer 7; a read only memory (ROM) 14 in which a basic input/output program (BIOS) of the system has been stored; a random access memory (RAM) 15 which is used as a work area for loading various programs and font-related data stored in the external storing device 9 or ROM 14 and temporarily storing them; and a central processing unit (CPU) 17, connected to each of the above component elements via a system bus 16, for controlling the whole system.

Figures 2, 4:
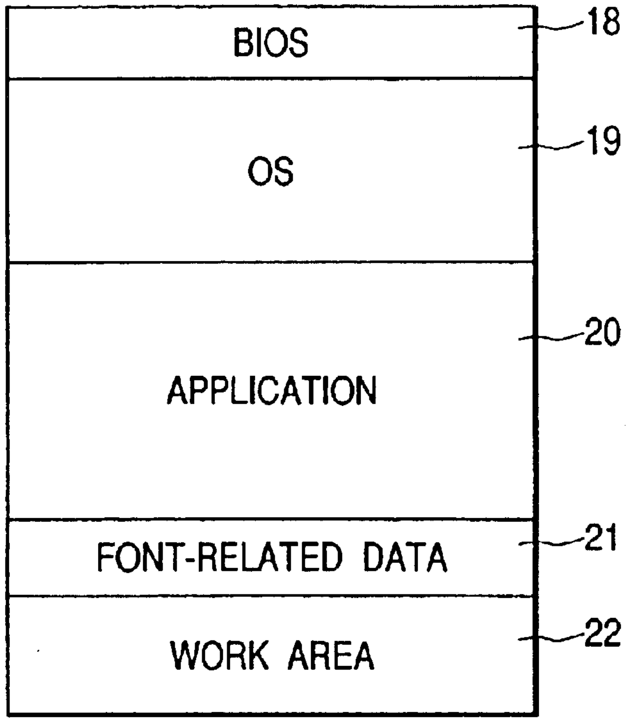
FIG. 2 is a memory map in an RAM.
FIG. 4 is a country information table.

FIG. 2 is a memory map in the RAM 15.

When a power switch (not shown) of the character processing apparatus is turned on, the basic I/O program stored in the ROM 14 is loaded into the RAM 15 and is written into a basic input/output program memory area 18. Subsequently, the operating system stored in the HD 5 is read out and written into an operating system memory area 19 by an IPL (initial program load) function of the basic I/O program. The relevant operation is started.

A predetermined application program and font-related data stored in the FD 4 or CD-ROM 6 are sequentially loaded into the RAM 15 and written into an application memory area 20 and a font-related data memory area 21.

By temporarily installing the application program and font-related data onto the HD 5, they can be loaded from the HD 5 into the RAM 15, or they can be directly loaded from the FD 4 or CD-ROM 6 into the RAM 15 without installing onto the HD 5 and written into the respective memory areas 20 and 21. As font-related data which is written into the font-related data memory area 21, at least a font table and a country information table are included.

Reference numeral 22 denotes a work area which is used as an area for an arithmetic operation when each of the foregoing programs 18 to 20 is processed by the CPU 17.

FIGS. 3A and 3B show font tables. Font types such as Ming, Gothic, and the like, the character codes of glyphs, a country ID to identify a country in which the glyphs are used, and glyph data corresponding to the character codes have been stored in the font table.

FIG. 4 is a country information table. Country IDs such as "1", "2", "3", and "4" are allocated to country information such as "Japanese", "traditional-Chinese", "simplified-Chinese", "Korean", and the like in the country information table. In the embodiment, by selecting desired country information, the country and glyph data corresponding to the country ID are written into the font tables. The contents of the font tables are installed, a use language is established, and a document is formed. In the embodiment, FIG. 3A shows a case where Japanese (country ID is equal to "1") is designated as country information. FIG. 3B shows a case where traditional-Chinese (country ID is equal to "2") is designated as country information.

Figure 5:
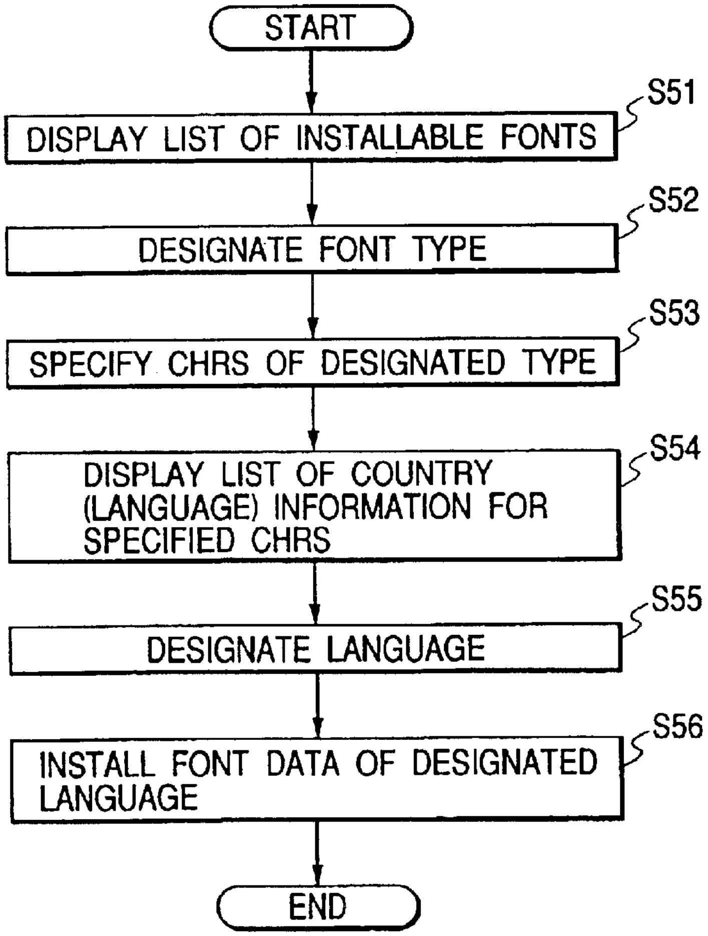
FIG. 5 is a flowchart showing a processing method of character data according to the invention.

FIG. 5 is a flowchart for an application program showing a processing method of character data according to the invention. The application program is executed by the CPU 17. First in step S51, a list of fonts which can be installed is displayed on the CRT display 3. In step S52, subsequently, the type of font to be installed such as Ming or Gothic selected by the operation of the keyboard 1, pointing device 2, or the like by the user is designated. In step S53, characters of the designated type are specified. In step S54, a list of country information of the country ID of the characters specified by using the country information table in FIG. 4 is displayed on the CRT display 3.

Figure 6:
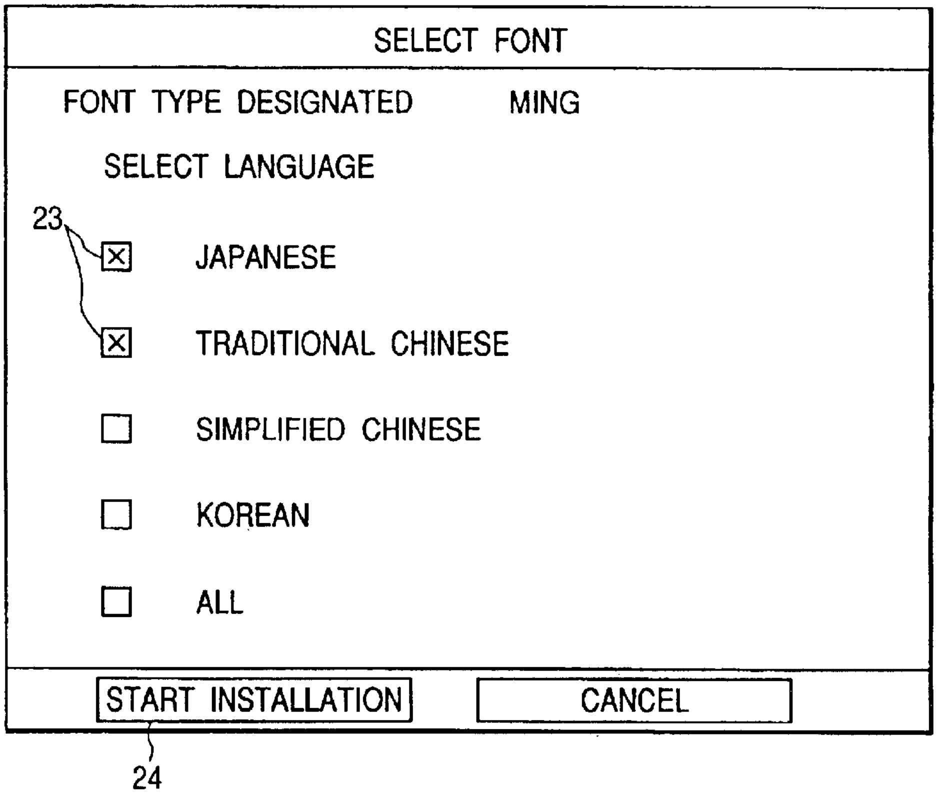
FIG. 6 is a display picture plane on a CRT display in case of designating country information.

That is, as shown in FIG. 6, a list of languages (country information list) is displayed on the CRT display 3. In step S55, by the operation of the PD2 by the user, "x" is checked in check boxes 23 of, for example, "Japanese" and "traditional-Chinese", thereby designating a language to be installed, namely, a language to be installed in accordance with the selection of "country".

In step S56, font data of the designated language or country is read out and installed in accordance with an instruction to start installation "24" of the user. The processing routine is finished.

According to the embodiment as mentioned above, since the glyph used in only a specific country or region is automatically selected and a document is formed, the troublesome operation to check whether the relevant glyph is the glyph used in the relevant country or region or not on the CRT display 3 can be omitted. Thus, a system environment of high efficiency in which a document can be easily and promptly formed by using desired characters can be constructed.

(Other Embodiments of the Invention)

The embodiment of the invention has been described with respect to the example in which the type (font name) of the font selected by the user is designated, a list of the country information (languages) of the characters of the designated types (fonts) is displayed, the language selected by the user is designated from the displayed languages, and the font data of the designated language is installed. However, in another embodiment, an example in which a language or country is first designated, a type is subsequently designated, and the relevant font data is installed will now be described with reference to FIGS. 7 and 8.

Figure 7:
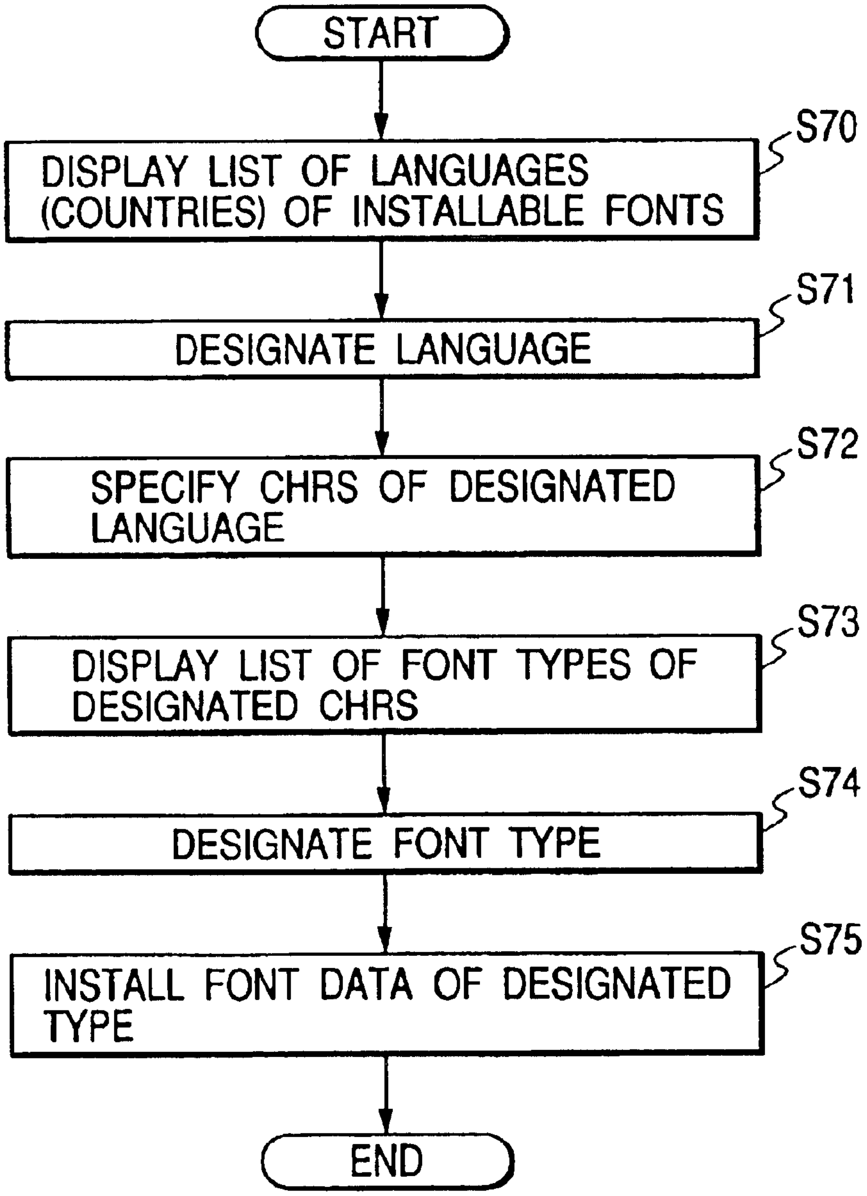
FIG. 7 is a diagram showing a flowchart for another embodiment.
Figure 8:
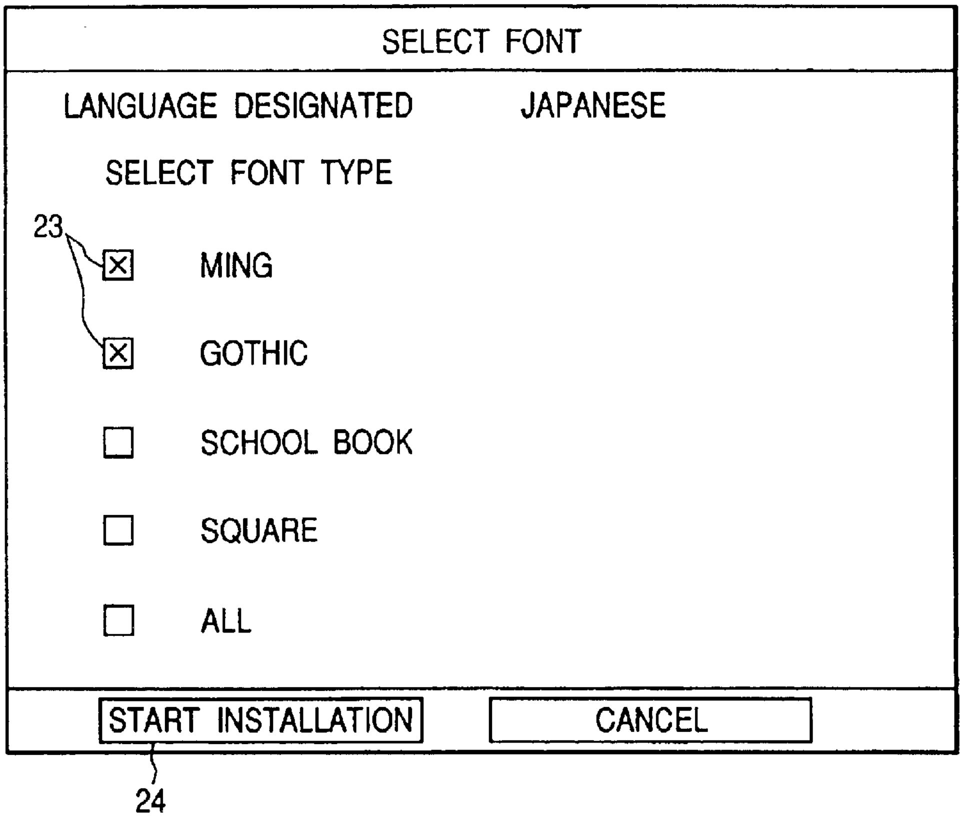
FIG. 8 is a diagram showing a display picture plane of another embodiment.

First, in step S70 in FIG. 7, on the basis of the country ID of the font data and the country information table of FIG. 4, a list of languages or countries of fonts which can be installed is displayed on the CRT display 3. In step S71, the user designates the selected language or country with reference to the CRT display 3. In step S72, the characters of the designated language or country are specified. In step S73, a list of types of the fonts of the specified characters is displayed on the CRT display 3 (FIG. 8). In step S74, with reference to the CRT display 3, the user designates the type of font with the check box 23 which was checked. In step S75, in response to the start installation "24" by the user, the font data of the type of the designated font is read out and installed.

The invention is not limited to the above embodiments. Although the embodiments have been described with respect to the example of using the FD 4, HD 5, or CD-ROM 6 as an external storing device 9, any other memory media, for example, an optical disk, a magnetooptic disk, a CD-R, a magnetic tape, a nonvolatile memory, and the like can be used.

It will be obviously understood that the objects of the invention can be accomplished by a method whereby program codes of the application programs are stored in various memory media and the CPU 17 reads out the program codes and executes the foregoing processes.

Further, in this case, the object of the invention is also accomplished by a method whereby the CPU 17 executes a part or all of the actual processes by the OS or the like on the basis of instructions of the program codes and the foregoing processing method of the character data is included in the OS or the like.

It will be obviously understood that the object of the invention can be accomplished by a method whereby a function expanding board or a function expanding unit is installed to the apparatus main unit 8, the program codes read out from the memory medium are written into a memory of the function expanding board or function expanding unit, and after that, the CPU 17 executes a part or all of the actual processes on the basis of instructions of the program codes.

According to the character processing apparatus, character processing method, and memory medium of the embodiments of the invention as described in detail above, in case of performing a character process by using the unified character code system, the glyph which is used only in the specific country or region is automatically selected and a document is formed. Therefore, the troublesome operation to discriminate whether the glyph is a glyph used in the relevant country or region or not while observing the display picture plane can be omitted. Consequently, a document can be easily and promptly formed by using desired characters. A system environment of a high efficiency can be constructed.

According to the invention as described in detail above, the font of the language or country which is desired by the user is extracted from the fonts corresponding to a plurality of languages or countries and can be installed.

After the type of font was specified, the language or country can be selected.

Therefor, the font of the type of the front which is desired by the user can be extracted and installed.

What is claimed is:

1. A character processing apparatus comprising:

first designating means for designating a font type;

second designating means for designating a language from among a plurality of languages corresponding to the font type designated by said first designating means, said second designating means capable of designating traditional Chinese and simplified Chinese distinguishably from each other and collectively designating at least two of the plurality of languages corresponding to the font type designated by said first designating means; and installing means for installing a certain font data group corresponding to a predetermined code portion of a unicode based on information indicating the language designated by said second designating means from a memory means that stores a plurality of font data groups for the respective plurality of languages corresponding to the unicode and the font type designated by said first designating means.

2. An apparatus according to claim 1, wherein said second designating means designates the at least two languages from the plurality of languages displayed on a list for selection, and said installing means installs the font data group based on the at least two languages selected from the list and the font type designated by said first designating means.

3. An apparatus according to claim 1, wherein the font type is a font name.

4. An apparatus according to claim 1, wherein the memory means stores identification information to identify for which language each font data group is provided, and the font data group for the language designated by said second designating means is specified based on the stored identification information.

5. A character processing method comprising:

a first designating step of designating a font type;

a second designating step of designating a language from among a plurality of languages corresponding to the font type designated in said first designating step, wherein traditional Chinese and simplified Chinese can be designated distinguishably from each other and at least two of the plurality of languages corresponding to the font type designated in said first designating step are collectively designated; and an installing step of installing a certain font data group corresponding to a predetermined code portion of a unicode based on information indicating the language designated in said second designating step from a memory that stores a plurality of font data groups for the respective plurality of languages corresponding to the unicode and the font type designated in said first designating step.

6. A method according to claim 5, wherein in said second designating step, the at least two languages are designated from the plurality of languages displayed in a list for selection, and the font data group is installed in said installing step based on the at least two languages selected from the list and the font type designated in said first designating step.

7. A method according to claim 5, wherein the font type is a font name.

8. A method according to claim 5, wherein the memory stores identification information to identify for which language each font data group is provided, and the font data group for the language designated in said second designating step is specified based on the stored identification information.

9. A computer-readable memory medium for storing a program, wherein said program comprises:

a first designating step of designating a font type;

a second designating step of designating a language from among a plurality of languages corresponding to the font type designated in said first designating step, wherein traditional Chinese and simplified Chinese can be designated distinguishably from each other and at least two of the plurality of languages corresponding to the font type designated in said first designating step are collectively designated; and an installing step of installing a certain font data group corresponding to a predetermined code portion of a unicode based on information indicating the language designated in said second designating step from a memory that stores a plurality of font data groups for the respective plurality of languages corresponding to the unicode and the font type designated in said first designating step.

10. A medium according to claim 9, wherein in said second designating step, the at least two languages are designated from the languages displayed in a list for selection, and the font data group is installed in said installing step based on the at least two languages selected from the list and the font type designated in said first designating step.

11. A medium according to claim 9, wherein the font type is a font name.

12. A medium according to claim 9, wherein the memory stores identification information to identify for which language each font data group is provided, and the font data group for the language designated in said second designating step is specified based on the stored identification information.

13. A character processing apparatus for installing font data for a predetermined language, comprising:

first designating means for designating a font type;

second designating means for designating at least two languages from among a plurality of languages corresponding to the font type designated by said first designating means, said second designating means capable of designating traditional Chinese and simplified Chinese distinguishably from each other and collectively designating at least two of the plurality of languages corresponding to the font type designated by said first designating means; and installing means for installing a certain font data group corresponding to a predetermined code portion of a unicode based on information indicating the at least two languages designated by said second designating means from a memory means that stores a plurality of font data groups for the respective plurality of languages corresponding to the unicode and the font type designated by said first designating means.

14. A character processing method for installing font data for a predetermined language, comprising:

a first designating step of designating a font type;

a second designating step of designating at least two languages from among a plurality of languages corresponding to the font type designated in said first designating step, said second designating step capable of designating traditional Chinese and simplified Chinese distinguishably from each other and collectively designating at least two of the plurality of languages corresponding to the font type designated by said first designating step; and an installing step of installing a certain font data group corresponding to a predetermined code portion of a unicode based on information indicating the at least two languages designated in said second designating step from a memory means that stores a plurality of font data groups for the respective plurality of languages corresponding to the unicode and the font type designated in said first designating step.

15. A computer-readable memory medium for storing a program, wherein said program comprises:

a first designating step of designating a font type;

a second designating step of designating at least two languages from among a plurality of languages corresponding to the font type designated in said first designating step, said second designating step capable of designating traditional Chinese and simplified Chinese distinguishably from each other and collectively designating at least two of the plurality of languages corresponding to the font type designated by said first designating step; and an installing step of installing a certain font data group corresponding to a predetermined code portion of a unicode based on information indicating the at least two languages designated in said second designating step from a memory means that stores a plurality of font data groups for the respective plurality of languages corresponding to the unicode and the font type designated in said first designating step.

16. A computer-executable program stored on a computer-readable medium, said computer-executable program for installing font data for a predetermined language, comprising:

code for a first designating step of designating a font type;

code for a second designating step of designating at least two languages from among a plurality of languages corresponding to the font type designated in said first designating step, said second designating step capable of designating traditional Chinese and simplified Chinese distinguishably from each other and collectively designating at least two of the plurality of languages corresponding to the font type designated by said first designating step; and code for an installing step of installing a certain font data group corresponding to a predetermined code portion of a unicode based on information indicating the at least two languages designated in said second designating step from a memory means that stores a plurality of font data groups for the respective plurality of languages corresponding to the unicode and the font type designated in said first designating step.

* * * * *

UNITED STATES PATENT AND TRADEMARK OFFICE

CERTIFICATE OF CORRECTION

PATENT NO. : 6,826,728 B1 Page 1 of 1
DATED : November 30, 2004
INVENTOR(S) : Horiyama It is certified that error appears in the above-identified patent and that said Letters Patent is hereby corrected as shown below:

Title page,
Item [56], References Cited, OTHER PUBLICATIONS,
"Yamada," reference, "2/998," should read -- 2/1998, --;
"Setting Fonts" reference, "SItes" should read -- Sites --; and
"Bames" should read -- Barnes --.

Column 1,
Line 25, "classified" should read -- classified as --;
Line 36, "distinguishing" should read -- distinguishing between --; and
Line 41, "not" should read -- neither --.

Column 2,
Line 35, "an" should read -- a --.

Column 5,
Line 56, "the" should be deleted.

Column 6,
Lines 22 and 57, "the" should be deleted.

Signed and Sealed this

Fifth Day of April, 2005

JON W. DUDAS
*Director of the United States Patent and Trademark Office*